United States Patent
Huttenlocher et al.

(10) Patent No.: US 12,202,493 B2
(45) Date of Patent: Jan. 21, 2025

(54) DRIVETRAIN HAVING A DRIVEABLE REAR AXLE AND HAVING A VEHICLE TRANSMISSION, METHOD FOR OPERATING SAID DRIVETRAIN, AND MOTOR VEHICLE HAVING SAID DRIVETRAIN

(71) Applicant: Bayerische Motoren Werke Aktiengesellschaft, Munich (DE)

(72) Inventors: Benjamin Huttenlocher, Munich (DE); Georg Johann Meingassner, Taufkirchen (DE); Aditya Sharma, Eching (DE); Reinhard Simkovics, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 484 days.

(21) Appl. No.: 17/420,945

(22) PCT Filed: Jan. 15, 2020

(86) PCT No.: PCT/EP2020/050852
§ 371 (c)(1),
(2) Date: Jul. 6, 2021

(87) PCT Pub. No.: WO2020/164839
PCT Pub. Date: Aug. 20, 2020

(65) Prior Publication Data
US 2022/0089169 A1    Mar. 24, 2022

(30) Foreign Application Priority Data
Feb. 13, 2019   (DE) .................... 10 2019 103 559.7

(51) Int. Cl.
*B60W 50/02*   (2012.01)
*B60W 10/08*   (2006.01)
(Continued)

(52) U.S. Cl.
CPC ........ *B60W 50/0205* (2013.01); *B60W 10/08* (2013.01); *B60W 10/11* (2013.01); *B60W 50/035* (2013.01)

(58) Field of Classification Search
CPC .. B60W 50/0205; B60W 10/08; B60W 10/11; B60W 50/035; B60W 2050/0006;
(Continued)

(56) References Cited

U.S. PATENT DOCUMENTS

| | | |
|---|---|---|
| 6,628,993 B1 | 9/2003 | Bauer |
| 2003/0105537 A1 | 6/2003 | Crispin et al. |

(Continued)

FOREIGN PATENT DOCUMENTS

| | | |
|---|---|---|
| CN | 202728222 U | 2/2013 |
| CN | 106143206 A | 11/2016 |

(Continued)

OTHER PUBLICATIONS

International Search Report (PCT/ISA/210) issued in PCT Application No. PCT/EP2020/050852 dated Apr. 23, 2020 with English translation (five (5) pages).

(Continued)

*Primary Examiner* — Abby Y Lin
*Assistant Examiner* — Esvinder Singh
(74) *Attorney, Agent, or Firm* — Crowell & Moring LLP

(57) ABSTRACT

A drivetrain has at least one electric drive machine configured for driving a motor vehicle, a drivable rear motor vehicle axle for transmitting drive forces of the electric drive machine to a roadway surface, and a vehicle transmission which has at least one transmission ratio stage and which is configured for transmitting drive forces in the direction of the drivable rear motor vehicle axle. The transmission ratio stage can, in at least one operating mode of the drivetrain, be engaged by a transmission control unit. The vehicle trans- (Continued)

mission can, from the transmission ratio stage, be shifted by the transmission control unit into a neutral position in which a transmission output shaft is freely rotatable relative to a transmission input shaft. For control of the electric drive machine, an electric motor control unit is provided, wherein the electric drive machine is, by way of the electric motor control unit, operable at least in a motor operating mode and in a neutral mode, in which the electric drive machine is rotatable in a manner free from torque. The electric motor control unit and the transmission control unit are connected to one another by at least two control lines configured for transmitting control commands between the control units. A control command can be transmitted by the electric motor control unit via at least one of the two control lines to the transmission control unit, such that the transmission control unit sets the vehicle transmission into the neutral position.

5 Claims, 2 Drawing Sheets

(51) Int. Cl.
*B60W 10/11* (2012.01)
*B60W 50/035* (2012.01)

(58) Field of Classification Search
CPC . B60W 2050/0292; B60W 2050/0295; B60W 10/10; B60W 50/04; B60W 20/50; B60W 2030/18081; B60W 2030/1809; B60W 30/18127; B60W 2510/101; B60W 2510/1065; B60W 2710/1066; B60W 20/00; B60W 20/30; B60W 2050/021; B60W 50/045; B60W 50/038; B60W 2510/0657; B60W 2510/083; B60W 10/06; B60L 2240/486; B60L 3/0023; B60L 3/0092; B60L 15/2054; B60L 2240/48; B60L 2260/14; B60L 15/20; B60L 2240/423; B60L 2240/443; Y02T 10/64; Y02T 10/72
See application file for complete search history.

(56) References Cited

U.S. PATENT DOCUMENTS

| | | | |
|---|---|---|---|
| 2006/0087269 A1* | 4/2006 | Iwazawa | B62D 5/046 318/432 |
| 2014/0336864 A1* | 11/2014 | Yoshida | B60W 50/04 701/29.2 |
| 2015/0183417 A1* | 7/2015 | Munsell | B60W 10/10 180/65.265 |
| 2015/0258981 A1* | 9/2015 | Wang | B60W 10/11 180/65.265 |
| 2018/0029596 A1* | 2/2018 | Zhang | B60K 17/043 |
| 2018/0052463 A1* | 2/2018 | Mays | B60T 7/22 |
| 2018/0099655 A1* | 4/2018 | Park | B60K 6/26 |
| 2018/0118190 A1* | 5/2018 | Ruybal | B60W 20/15 |
| 2019/0009686 A1 | 1/2019 | Wang | |
| 2019/0165994 A1* | 5/2019 | Togo | H04L 43/0811 |
| 2020/0139903 A1* | 5/2020 | Kamio | H02P 29/027 |

FOREIGN PATENT DOCUMENTS

| | | |
|---|---|---|
| CN | 107054057 A | 8/2017 |
| DE | 199 33 086 A1 | 1/2001 |
| DE | 10 2005 034 831 A1 | 2/2007 |
| DE | 20 2013 004 420 U1 | 10/2014 |
| DE | 10 2015 220 758 A1 | 4/2017 |
| DE | 10 2018 116 586 A1 | 1/2019 |
| EP | 1 219 489 A2 | 7/2002 |
| JP | 2013-130288 A | 7/2013 |

OTHER PUBLICATIONS

German-language Written Opinion (PCT/ISA/237) issued in PCT Application No. PCT/EP2020/050852 dated Apr. 23, 2020 (seven (7) pages).
German-language Search Report issued in German Application No. 10 2019 103 559.7 dated Oct. 11, 2019 with partial English translation (11 pages).
International Standard ISO 26262-1, Road vehicles—Functional safety—Part 1: Vocabulary, Second Edition Dec. 2018. (44 pages).
Chinese-language Office Action issued in Chinese Application No. 202080007535.5 dated Dec. 13, 2023 with English translation (13 pages).
Chinese-language Office Action issued in Chinese Application No. 202080007535.5 dated Jun. 14, 2024 with English translation (10 pages).

* cited by examiner

DRIVETRAIN HAVING A DRIVEABLE REAR AXLE AND HAVING A VEHICLE TRANSMISSION, METHOD FOR OPERATING SAID DRIVETRAIN, AND MOTOR VEHICLE HAVING SAID DRIVETRAIN

BACKGROUND AND SUMMARY OF THE INVENTION

The invention relates to a drivetrain having at least one electric drive machine configured for driving a motor vehicle.

DE 10 2018 116 586 A1 discloses a hybrid drivetrain in which the rear axle is drivable by means of a first drive machine via a switchable transmission.

In a drive train having, in particular, a rear axle for a motor vehicle, which can be driven by an internal combustion engine, it is required in consideration of certain stipulations, for example in consideration of ISO 26262, Road vehicles—Functional safety, that certain components meet specified safety standards, in particular in relation to functional safety (FuSa). The invention proposes a drivetrain which fulfills specified requirements in a simple manner and enables an efficient vehicle drive.

This object is achieved by a drivetrain and by a motor vehicle having such a drivetrain according to the independent claims. The subject matter of the dependent claims relates to preferred developments of the invention.

Within the context of the invention, a drivetrain having a switchable vehicle transmission, a drivable rear axle and at least one drive engine is understood to refer to a drivetrain for a motor vehicle, in particular an automobile, in which at least this at least one drive engine is used individually or together with at least one further drive engine for driving a motor vehicle at the rear axle. The drive power transmitted by the at least one drive engine is furthermore transmitted to the rear axle by means of a switchable vehicle transmission, wherein this vehicle transmission has at least one switchable transmission ratio, a so-called gear. In such a drivetrain, the transmission of drive forces is accordingly enabled at least by one gear stage, wherein this gear stage can be activated by the transmission control unit and can therefore be switched by the transmission control unit. Within the context of the invention, the activated gear stage is understood to mean that the drive forces can be transmitted from the vehicle transmission via this gear ratio/gear stage. In other words, if this at least one gear stage is not activated, the transmission of drive forces by this vehicle transmission is enabled by another gear stage or the vehicle transmission is preferably shifted to a neutral position so that the transmission of drive forces by the vehicle transmission is not enabled.

In particular, the drivetrain can be designed as a so-called hybrid drivetrain (internal combustion engine and electric drive engine (also known as an electric drive machine)) or as an electric drivetrain having at least one electric drive engine, so-called "battery electric vehicle" (BEV). In addition to an electric drive engine, or an electric drive engine and an internal combustion engine, the proposed drivetrain can preferably also have further drive engines.

Within the context of the invention, a drivable motor vehicle axle is understood to be a device for transmitting drive forces, which are provided by at least one of the said drive engines, to a roadway surface and for transmitting track guiding forces to this roadway surface. The drivable motor vehicle axle is furthermore designed as a rear axle.

The motor vehicle preferably has a main direction of travel (forward direction of travel) and the drivable motor vehicle axis is arranged at the rear of the vehicle in relation to this main direction of travel. In addition to this drivable motor vehicle axle, a further drivable motor vehicle axle can also be provided, so-called all-wheel drive, or the motor vehicle has only the proposed drivable motor vehicle axle, so-called rear-wheel drive.

Within the context of the invention, the vehicle transmission of the drivetrain is understood to be a transmission for transmitting drive forces which are at least provided by one of the said drive engines, preferably by the internal combustion engine, and for providing different, preferably discrete, gear ratios, so-called gears, during the transmission of this drive power. Regardless of its type, the vehicle transmission is preferably designed as a vehicle transmission with at least periodically or continuously automatic or automated switching.

Such a vehicle transmission furthermore has at least one, preferably multiple, different gear stages, so-called gears, for transmitting drive forces from the internal combustion engine to the drivable motor vehicle axle. A neutral position of the vehicle transmission does not refer to a gear or gear stage as presented above since drive forces cannot be transmitted by the vehicle transmission in this gear or gear stage.

In a vehicle transmission, a neutral position can also be represented by uncoupling the drive engine, in particular when the transmission output shaft can rotate at least virtually freely when the drive engine is uncoupled.

The vehicle transmission is preferably configured in such a way that it has at least one gear stage and this vehicle transmission can furthermore preferably be switched periodically, i.e. in particular in one of several operating modes, or preferably in all operating modes, and therefore continuously, in an automatic or automated manner by a transmission control unit. This one gear stage is preferably understood to be a switchable gear stage, wherein the vehicle transmission can be switched between a neutral gear and the at least one gear stage or between the at least one gear stage and at least one further gear stage by the transmission control unit. With regard to their type, such vehicle transmissions are particularly known from the prior art as dual clutch transmissions, automatic transmissions, which are designed in particular as planetary transmissions having one or preferably more planetary transmission gear sets, or as an automated shift transmission, in particular as a manual shift transmission.

Such a vehicle transmission furthermore also has a so-called neutral position, which is referred to in everyday language as neutral gear or neutral position of the vehicle transmission. In the neutral position of the vehicle transmission, at least one transmission output shaft can rotate freely with respect to the vehicle transmission so that drive forces cannot be transmitted by the vehicle transmission. The transmission output shaft should therefore be particularly understood to refer to a transmission shaft which outputs drive forces from the vehicle transmission when these drive forces are transmitted by the vehicle transmission, in particular from at least one of the drive engines.

An E-motor control unit, preferably a so-called inverter, is furthermore provided for controlling the electric drive engine. The electric drive engine can preferably be operated by means of this E-motor control unit, at least in a motor operation mode, wherein the electric drive engine outputs drive power (speed, torque) in this motor operation mode. The electric drive engine can furthermore be operated in a neutral mode, or shifted thereto, by the E-motor control unit, wherein the electric drive engine, or an output shaft of the electric drive engine, for outputting drive power (speed, torque) can rotate without torque, in particular in the neutral mode.

It is proposed that the E-motor control unit and the transmission control unit are connected to one another by at least two preferably mutually redundant control lines, which are configured for transmitting control commands between these two control units. A control command can furthermore be transmitted from the E-motor control unit to the transmission control unit via at least one of these two control lines, or via both, so that the transmission control unit switches the vehicle transmission to the neutral position.

The E-motor control unit is configured, in particular, for monitoring and controlling the electric drive engine, but also, in particular, for monitoring the vehicle transmission. In predefined operating cases, a fault in the vehicle transmission may be indicated via this monitoring function. In particular, if the vehicle transmission is jammed or if there is high internal friction in the vehicle transmission, the current consumption at the E-motor unit can exceed a threshold value. In particular, upon reaching or exceeding such a threshold value, the transmission control unit can be activated by the E-motor control unit in such a way that it shifts the vehicle transmission to its neutral position. In particular, as a result of this monitoring option and the enabled activation of the transmission control unit by the E-motor control unit, the vehicle transmission can be switched to the neutral position indirectly by the E-motor control unit and a redundant and therefore particularly operationally safe activation of the drivetrain is thus enabled.

In a preferred embodiment of the invention, in the proposed drivetrain, a control command can be transmitted from the transmission control unit to the E-motor control unit via at least one of these two control lines, preferably via both. In particular, by means of this control command, the electric drive engine can be shifted to the neutral mode by the transmission control unit via the E-motor control unit. In other words, the electric drive engine can thus be shifted to neutral mode indirectly by the transmission control unit. Furthermore, certain operating parameters which may indicate a fault in or at the electric drive engine can be monitored by the transmission control unit and, with the proposed drivetrain, redundant activation of the drivetrain is enabled and, in particular, particularly safe operation thereof is thus enabled.

A method for operating the drivetrain is furthermore proposed and a drivetrain which is operated by the method explained below is thereby also proposed.

The method for operating the drivetrain has, in particular, the method steps:
  determining a transmission fault, in particular by means of the E-motor control unit;
  communicating the transmission fault, in particular to the transmission control unit; and
  shifting the vehicle transmission to the neutral position, in particular by means of the transmission control unit.

The transmission fault is therefore preferably determined by the E-motor control unit, and thereby in particular in addition to the transmission control unit, and the necessary method steps for determining a transmission fault are preferably executed at the E-motor control unit and/or at the transmission control unit. By means of the proposed method, redundant monitoring of the vehicle transmission both by the transmission control unit and, in addition, by the E-motor control unit is therefore enabled. In particular, the operational safety is increased by redundant monitoring of a component.

In this case, a plurality of potentially possible transmission faults and methods for determining them are known; in particular, torque/speed values at the vehicle transmission, temperatures and/or noises can be recorded by suitable sensors and evaluated in the E-motor control unit or in the transmission control unit. In particular, as a result of such a configuration of the drivetrain, the vehicle transmission is redundantly monitored by the transmission control unit and the E-motor control unit and, by using two control units which are present in any case, both safe and cost-effective operation of the drivetrain is enabled.

In a preferred embodiment, the method for operating the drivetrain has the method steps: determining an electric drive engine fault, in particular by means of the transmission control unit; communicating this fault, in particular to the E-motor control unit; and shifting the electric drive engine to neutral mode, in particular by means of the E-motor control unit.

The electric drive engine fault is therefore preferably determined by the transmission control unit in addition or alternatively to the E-motor control unit, and the necessary method steps for determining an electric drive engine fault are preferably executed at the E-motor control unit and/or at the transmission control unit. By means of the proposed method, redundant monitoring of the electric drive engine both by the transmission control unit and, in addition, by the E-motor control unit is therefore enabled. In particular, the operational safety is increased by redundant monitoring of a component.

In this case, a plurality of potentially possible drive engine faults and methods for determining them are known; in particular, torque values at the electric drive engine, temperatures, current or voltage values and/or noises can be recorded by suitable sensors. In particular, as a result of such a configuration of the drivetrain, the electric drive engine is redundantly monitored by the transmission control unit and the E-motor control unit and, by using two control units which are present in any case, both safe and cost-effective operation of the drivetrain is enabled.

A motor vehicle having a drivetrain according to the type described above and preferably with the mode of operation described above is furthermore provided.

Individual features and embodiments of the invention are explained in more detail below with reference to the figures.

DETAILED DESCRIPTION OF THE DRAWINGS

Figure 1:
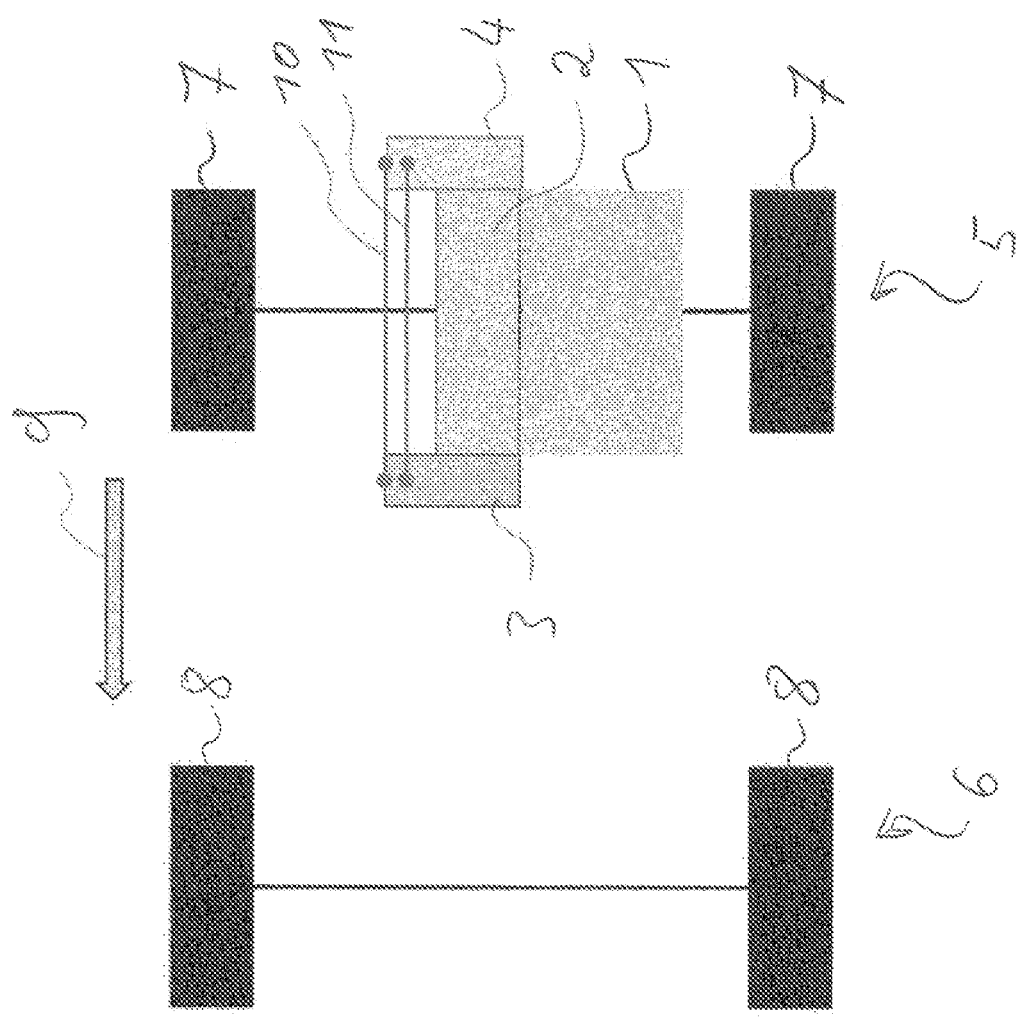
FIG. 1 is a first embodiment of the proposed drivetrain as a hybrid drivetrain.

FIG. 1 shows a transverse drivetrain in the form of a hybrid drivetrain with a driven rear axle 5 and a steerable front axle 6 for a motor vehicle. In a transverse hybrid drivetrain, the internal combustion engine 1 is arranged transversely to the forward direction of travel 9 in the motor vehicle.

In the forward direction of travel 9, the drivable rear axle 5 is located at the rear of the motor vehicle and the steerable front axle 6 is located at the front. Two drivable wheels 7 are provided on the rear axle 5, which are configured for transmitting drive forces to a roadway surface. Two steerable front wheels 8 are arranged on the front axle, which are configured for transmitting steering forces.

The drive forces transmitted by the drivable wheels 7 are provided by the internal combustion engine 1 and/or by an electric drive engine, wherein the electric drive engine is structurally integrated in the vehicle transmission 2. The E-motor control unit 3 designed as an inverter is provided for controlling and monitoring the electric drive engine. The transmission control unit 4 is provided for controlling and monitoring the vehicle transmission 2.

The two control units 3 and 4 are connected to one another via the two, in particular mutually redundant, control lines 10 and 11.

In this case, the invention follows the basic principle: prevent too great a deceleration at the rear axle 5 in the event of a fault—here referring to faults in the electric drive engine or in the vehicle transmission 2—by means of redundant and mutual monitoring of the transmission control unit and the E-motor control unit, i.e. the power electronics/inverter for controlling the electric drive engine.

Essentially, at least two cases are conceivable which show the advantageous effect of this mutual monitoring of the control units (3, 4). Case 1: a transmission fault —occurs, which is detected by the E-motor control unit 3. In this fault case (transmission fault), the vehicle transmission 2 or the transmission control unit 4 is preferably switched to currentless and the vehicle transmission 2 is thereby preferably switched to the neutral position. In particular, as a result of this control, a transmission output torque, i.e. a torque acting on the drivable rear axle 5 from the vehicle transmission 2, is therefore reduced to below a threshold value and preferably at least substantially to zero.

Case 2: a fault occurs at the electric drive engine, a so-called E-engine drive fault. In the event of this fault (E-engine drive fault), the E-engine control unit, in particular as the power electronics or the inverter, is preferably switched to currentless and a torque output by the electric drive engine, a so-called E-engine torque, is therefore reduced to below a threshold value and preferably at least substantially to zero.

To operate a hybrid drivetrain in the proposed manner, the E-engine control unit and the transmission control unit are connected to one another via a communications interface which has the two control lines 10 and 11.

In the invention, the E-engine control unit and the transmission control unit assume complementary functions for mutual monitoring of the safety functions (redundancy).

Figure 2:
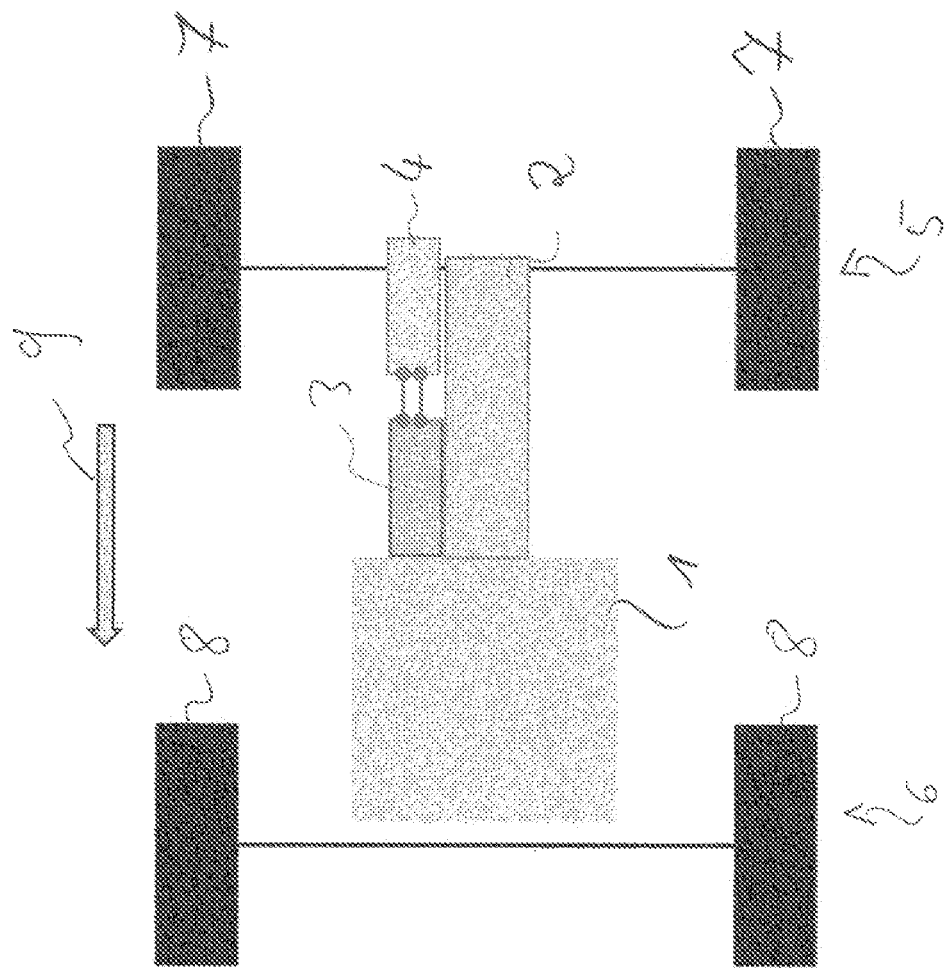
FIG. 2 is a second embodiment of the proposed drivetrain as a hybrid drivetrain.

The drivetrain illustrated in FIG. 2 is designed in the form of a hybrid drivetrain and differs structurally from the hybrid drivetrain illustrated in FIG. 1 in that the internal combustion engine 1 is aligned longitudinally with respect to the forward direction of travel 9. Functionally, the two drivetrains (FIG. 1 and FIG. 2) correspond to one another.

| List of reference signs: | |
|---|---|
| 1 | Internal combustion engine |
| 2 | Vehicle transmission having electric drive engine |
| 3 | E-motor control unit |
| 4 | Transmission control unit |
| 5 | Drivable rear axle |
| 6 | Non-drivable front axle |
| 7 | Drivable rear wheel |
| 8 | Steerable front wheel |
| 9 | Forward direction of travel |

What is claimed is:

1. A drivetrain, for a motor vehicle, comprising:
   at least one electric drive engine configured for driving the motor vehicle;
   a drivable motor vehicle axle designed as a rear axle for transmitting drive forces of the at least one electric drive engine to a roadway surface;
   a vehicle transmission, which has at least one gear stage and is configured for transmitting drive forces in the direction of the drivable motor vehicle axle, wherein, in at least one operating mode of the drivetrain, said at least one gear stage is switchable by a transmission control unit and wherein, in addition to said at least one gear stage, the vehicle transmission is switchable by the transmission control unit to a neutral position in which a transmission output shaft rotates freely with respect to a transmission input shaft; and
   an E-motor control unit for controlling the electric drive engine, wherein the electric drive engine, by way of said E-motor control unit, is operatable at least in a motor operation mode and in a neutral mode, in which the electric drive engine rotates without torque, wherein
   the E-motor control unit and the transmission control unit are connected to one another by at least two control lines, which are configured for transmitting control commands between said control units, and
   the E-motor control unit monitors current consumption at the electric drive engine, in such a way that when the current consumption exceeds a value associated with jamming or friction the E-motor control unit transmits a control command to the transmission control unit via both of the at least two control lines, which causes the transmission control unit to shift the vehicle transmission to the neutral position.

2. The drivetrain according to claim 1, wherein a control command is transmittable from the transmission control unit to the E-motor control unit via at least one of said two control lines so that the E-motor control unit shifts the electric drive engine to neutral mode.

3. A method for controlling a drivetrain, wherein the drivetrain comprises:
   at least one electric drive engine configured for driving a motor vehicle;
   a drivable motor vehicle axle designed as a rear axle for transmitting drive forces of the at least one electric drive engine to a roadway surface;
   a vehicle transmission, which has at least one gear stage and is configured for transmitting drive forces in the direction of the drivable motor vehicle axle, wherein, in at least one operating mode of the drivetrain, said at least one gear stage is switchable by a transmission control unit and wherein, in addition to said at least one gear stage, the vehicle transmission is switchable by the transmission control unit to a neutral position in which a transmission output shaft rotates freely with respect to a transmission input shaft; and
   an E-motor control unit for controlling the electric drive engine, wherein the electric drive engine, by way of said E-motor control unit, is operatable at least in a motor operation mode and in a neutral mode, in which the electric drive engine rotates without torque, wherein the E-motor control unit and the transmission control unit are connected to one another by at least two control lines, which are configured for transmitting control commands between said control units,
   wherein the method comprises the steps of:

monitoring current consumption at the electric drive engine the E-motor control unit, wherein a transmission fault is determined if a deviation of the monitored current consumption from a set value associated with jamming or friction is detected; and transmitting, when the current consumption exceeds the set value, a control command to the transmission control unit via both of the at least two control lines, which causes the transmission control unit to shifts the vehicle transmission to the neutral position.

4. The method for controlling a drivetrain according to claim 3, wherein at least one operating parameter of the electric drive engine is monitored by at least one further monitoring device, an E-engine fault is determined if a deviation of the monitored operating parameter from a set value is detected, and the E-engine fault is determined by the transmission control unit, wherein the transmission control unit outputs a control command to the E-engine control unit via at least one of the two control lines so that the E-engine control unit shifts the electric drive engine to neutral mode.

5. A motor vehicle, comprising:

a drivetrain comprising:

at least one electric drive engine, which is configured for driving the motor vehicle;

a drivable motor vehicle axle, which is designed as a rear axle and for transmitting drive forces of the at least one electric drive engine to a roadway surface; and a vehicle transmission, which has at least one gear stage and is configured for transmitting drive forces in the direction of the drivable motor vehicle axle, wherein, in at least one operating mode of the drivetrain, said at least one gear stage is switchable by a transmission control unit and wherein, in addition to said at least one gear stage, the vehicle transmission is switchable by the transmission control unit to a neutral position in which a transmission output shaft rotates freely with respect to a transmission input shaft;

an E-motor control unit for controlling the electric drive engine, wherein the electric drive engine, by way of said E-motor control unit, is operatable at least in a motor operation mode and in a neutral mode, in which the electric drive engine rotates without torque, wherein the E-motor control unit and the transmission control unit are connected to one another by at least two control lines, which are configured for transmitting control commands between said control units, and the E-motor control unit monitors current consumption at the electric drive engine, in such a way that when the current consumption exceeds a value associated with jamming or friction the E-motor control unit transmits a control command to the transmission control unit via both of the at least two control lines, which causes the transmission control unit to shift the vehicle transmission to the neutral position.

* * * * *